(12) United States Patent
Lin et al.

(10) Patent No.: US 9,020,861 B2
(45) Date of Patent: *Apr. 28, 2015

(54) PREDICTIVE MODEL APPLICATION PROGRAMMING INTERFACE

(75) Inventors: Wei-Hao Lin, New York, NY (US); Travis H. K. Green, New York, NY (US); Robert Kaplow, New York, NY (US); Gang Fu, Kearny, NJ (US); Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 13/486,217

(22) Filed: Jun. 1, 2012

(65) Prior Publication Data
US 2012/0284600 A1 Nov. 8, 2012

Related U.S. Application Data

(63) Continuation of application No. 13/250,394, filed on Sep. 30, 2011, now Pat. No. 8,229,864.

(60) Provisional application No. 61/483,573, filed on May 6, 2011.

(51) Int. Cl.
*G06F 17/00* (2006.01)
*G06F 17/20* (2006.01)
*G06N 99/00* (2010.01)
*G06F 17/24* (2006.01)

(52) U.S. Cl.
CPC ............ *G06N 99/005* (2013.01); *G06F 17/246* (2013.01)

(58) Field of Classification Search
None
See application file for complete search history.

(56) References Cited

U.S. PATENT DOCUMENTS

| | | |
|---|---|---|
| 5,271,088 A | 12/1993 | Bahler |
| 6,243,696 B1 | 6/2001 | Keeler et al. |
| 6,778,959 B1 | 8/2004 | Wu et al. |
| 6,879,971 B1 | 4/2005 | Keeler et al. |
| 6,920,458 B1 | 7/2005 | Chu et al. |
| 7,010,696 B1 | 3/2006 | Cambridge et al. |
| 7,054,847 B2 | 5/2006 | Hartman et al. |
| 7,194,395 B2 | 3/2007 | Genovese |
| 7,349,919 B2 | 3/2008 | Russell et al. |
| 7,565,304 B2 | 7/2009 | Casati et al. |
| 7,590,589 B2 | 9/2009 | Hoffberg |
| 7,606,924 B2 | 10/2009 | Raz et al. |
| 7,650,331 B1 | 1/2010 | Dean et al. |
| 7,668,740 B1 | 2/2010 | Baggett et al. |
| 7,689,520 B2 | 3/2010 | Burges et al. |
| 7,788,195 B1 | 8/2010 | Subramanian et al. |
| 7,813,870 B2 | 10/2010 | Downs et al. |
| 7,813,944 B1 | 10/2010 | Luk et al. |
| 7,899,611 B2 | 3/2011 | Downs et al. |

(Continued)

OTHER PUBLICATIONS

Accelerating the Execution of Matrix Languages on the Cell Broadband Engine Architecture Khoury, R. ; Burgstaller, B. ; Scholz, B. Parallel and Distributed Systems, IEEE Transactions on vol. 22 , Issue: 1 DOI: 10.1109/TPDS.2010.58 Publication Year: 2011 , pp. 7-21.*

(Continued)

*Primary Examiner* — Michael B Holmes
(74) *Attorney, Agent, or Firm* — Fish & Richardson P.C.

(57) ABSTRACT

Methods, systems, and apparatus, including computer programs encoded on a computer storage medium, for utilizing predictive models from an application scripting language.

20 Claims, 4 Drawing Sheets

(56) References Cited

U.S. PATENT DOCUMENTS

| | | | |
|---|---|---|---|
| 7,912,628 B2 | 3/2011 | Chapman et al. | |
| 7,930,266 B2 | 4/2011 | Tuv et al. | |
| 7,970,721 B2 | 6/2011 | Leskovec et al. | |
| 7,979,365 B2 | 7/2011 | Goldberg et al. | |
| 8,027,854 B2 | 9/2011 | Baggett et al. | |
| 8,065,073 B2 | 11/2011 | Downs et al. | |
| 8,065,659 B1 | 11/2011 | Prince et al. | |
| 8,090,524 B2 | 1/2012 | Chapman et al. | |
| 8,244,651 B1* | 8/2012 | Lin et al. | 706/14 |
| 8,250,009 B1* | 8/2012 | Breckenridge et al. | 706/14 |
| 8,311,967 B1* | 11/2012 | Lin et al. | 706/45 |
| 8,364,613 B1* | 1/2013 | Lin et al. | 706/12 |
| 8,370,279 B1* | 2/2013 | Lin et al. | 706/12 |
| 8,370,280 B1* | 2/2013 | Lin et al. | 706/12 |
| 8,439,122 B2* | 5/2013 | Harvey et al. | 166/381 |
| 8,443,013 B1* | 5/2013 | Lin et al. | 707/810 |
| 8,473,431 B1* | 6/2013 | Mann et al. | 706/12 |
| 8,489,632 B1* | 7/2013 | Breckenridge et al. | 707/778 |
| 8,521,664 B1* | 8/2013 | Lin et al. | 706/12 |
| 8,533,222 B2* | 9/2013 | Breckenridge et al. | 707/774 |
| 8,533,234 B2* | 9/2013 | James | 707/802 |
| 8,554,703 B1* | 10/2013 | Lin et al. | 706/12 |
| 8,583,576 B1* | 11/2013 | Lin et al. | 706/21 |
| 8,595,154 B2* | 11/2013 | Breckenridge et al. | 706/12 |
| 8,606,728 B1* | 12/2013 | Lin et al. | 706/12 |
| 8,626,791 B1* | 1/2014 | Lin et al. | 707/778 |
| 8,694,540 B1* | 4/2014 | Lin et al. | 707/777 |
| 8,706,656 B1* | 4/2014 | Lin et al. | 706/12 |
| 8,706,659 B1* | 4/2014 | Mann et al. | 706/12 |
| 8,762,299 B1* | 6/2014 | Breckenridge et al. | 706/12 |
| 8,843,427 B1* | 9/2014 | Lin et al. | 706/45 |
| 8,868,472 B1* | 10/2014 | Lin et al. | 706/12 |
| 8,909,564 B1* | 12/2014 | Kaplow et al. | 706/12 |
| 8,909,568 B1* | 12/2014 | Mann et al. | 706/12 |
| 2002/0099730 A1 | 7/2002 | Brown et al. | |
| 2003/0145000 A1 | 7/2003 | Arning et al. | |
| 2003/0212851 A1 | 11/2003 | Drescher et al. | |
| 2005/0234753 A1 | 10/2005 | Pinto et al. | |
| 2007/0005311 A1 | 1/2007 | Wegerich et al. | |
| 2007/0150424 A1 | 6/2007 | Igelnik | |
| 2008/0097937 A1 | 4/2008 | Hadjarian | |
| 2008/0154821 A1 | 6/2008 | Poulin | |
| 2008/0270363 A1 | 10/2008 | Hunt et al. | |
| 2008/0288209 A1 | 11/2008 | Hunt et al. | |
| 2008/0288889 A1 | 11/2008 | Hunt et al. | |
| 2008/0294372 A1 | 11/2008 | Hunt et al. | |
| 2008/0294996 A1 | 11/2008 | Hunt et al. | |
| 2008/0319829 A1 | 12/2008 | Hunt et al. | |
| 2009/0006156 A1 | 1/2009 | Hunt et al. | |
| 2009/0018996 A1 | 1/2009 | Hunt et al. | |
| 2009/0106178 A1 | 4/2009 | Chu | |
| 2010/0049538 A1 | 2/2010 | Frazer et al. | |
| 2010/0100826 A1 | 4/2010 | Hawthorne et al. | |
| 2010/0293175 A1 | 11/2010 | Vadrevu et al. | |
| 2011/0145175 A1 | 6/2011 | Agarwal | |
| 2011/0289025 A1 | 11/2011 | Yan et al. | |
| 2011/0313900 A1 | 12/2011 | Falkenborg et al. | |

OTHER PUBLICATIONS

Computational Methods in the Warp Code Framework for Kinetic Simulations of Particle Beams and Plasmas Friedman, A. ; Cohen, R.H. ; Grote, D.P. ; Lund, S.M. ; Sharp, W.M. ; Vay, J.-L. ; Haber, I. ; Kishek, R.A. Plasma Science, IEEE Transactions on vol. 42 , Issue: 5 , Part: 1 DOI: 10.1109/TPS.2014.2308546 Pub Year: 2014 , pp. 1321-1334.*

Electronic structure of QD arrays: Application to intermediate-band solar cells Tomic, S. ; Harrison, N.M. ; Jones, T.S. Numerical Simulation of Optoelectronic Devices, 2007. NUSOD '07. International Conference on DOI: 10.1109/NUSOD.2007.4349034 Publication Year: 2007 , pp. 81-82.*

Computational methods in the Warp code framework for kinetic simulations of particle beams and plasmas Friedman, A. ; Cohen, R.H. ; Grote, D.P. ; Lund, S.M. ; Sharp, W.M. ; Vay, J.-L. ; Haber, I. ; Kishek, R.A. Plasma Science (ICOPS), 2013 Abstracts IEEE International Conference on DOI: 10.1109/PLASMA.2013.6633427 Pub Year: 2013 , p. 1.*

Google: "Google prediction API: Prediction v1.2 reference", Google Developers, 2012, retrieved from the Internet: URL: https://developers.google.com/prediction/docs/reference/v1.2/reference [retrieved on Jul. 27, 2012].

T. Green, et al.: "Prediction API: Every app a smart app", Google Developers Blog, Apr. 21, 2011, Retrieved from the Internet: URL:http//googledevelopers.blogspot.nl/2p/11/04/prediction-api-every-app-smart-app.html [retrieved on Jul. 27, 2012].

Google: "Google prediction API", Google Code, 2010, retrieved from the Internet: URL: http://code.google.com/apis/predict/ [retrieved on May 22, 2010].

N. Douarche, Examiner, International Search Report and Written Opinion for PCT Application Serial No. PCT/US2012/035862, search report completed Aug. 7, 2012, mailed Aug. 16, 2012, 112 pages.

P. Chanezon, et al.: "Google cloud for data crunchers", O'Reilly Strata Conference: Feb. 1-3, 2011 (Santa Clara, CA), Feb. 2, 2011, XP55034662, Retrieved from the Internet: URL:http://cdn.oreillystatic.com/en/assets/1/event/55/Google Cloud for Data Crunchers Presentation.pdf [retrieved on Jul. 27, 2012]; the whole document.

Cyclic Measures: "Google prediction API WinForm GUI demo", YouTube, Oct. 8, 2010, XP55034570, Retrieved from the Internet: URL:http://www.youtube.com/watch?v=m9k-zuA1PYI (retrieved on Jul. 27, 2012]; the whole document.

Google: "Google apps script: User Guide", Google Code, 2010, XP55034664, Retrieved from the Internet: URL:http://code.google.com/googleapps/apps script/guied.html [retrieved on Jan. 27, 2011] Building a User Interface.

Chandra, Tushar, "Sibyl: a system for large scale machine learning" Keynote I PowerPoint presentation, Jul. 28, 2010, ladisworkshop.org [online]. [Retrieved on Jan. 25, 2011]. Retrieved from the Internet: <URL: http://ladisworkshop.org/sites/default/files/LADIS%202010%20actual.pdf>, 43 pages.

Duchi, John, et al., "Boosting with Structural Sparsity", 2009, cs.berkeley.edu [online]. [Retrieved on Jan. 25, 2011]. Retrieved from the Internet: <URL: http://www.cs.berkeley.edu/~jduchi/projects/DuchiSi09d.pdf>, 41 pages.

Duchi, John, et al., "Boosting with Structural Sparsity", Proceedings of the 26th International Conference on Machine Learning, Montreal, Canada, 2009, cs.berkeley.edu [online]. [Retrieved on Jan. 25, 2011]. Retrieved from the Internet: <URL: http://www.cs.berkeley.edu/~jduchi/projects/DuchiSi09a.pdf>, 8 pages.

R-Project web pages, 190 pages [online]. [Retrieved on May 18, 2010]. Retrieved from the Internet: <URL: http://www.r-project.org/>, 190 pages.

Uclassify web pages, [online] [Retrieved on May 18, 2010]. Retrieved from the Internet: <URL: http://www.uclassify.com/>, 16 pages.

Zementis web pages [online]. [Retrieved on May 18, 2010]. Retrieved from the Internet: <URL: http://www.zementis.com/>, 34 pages.

PMML 4.0 General Structure of a PMML Document, [online] [Retrieved on May 1, 2011]. Retrieved from the Internet: <URL: dmg.org/v4-0-1/General Structure.html>, 9 pages.

Predictive Model Markup Language, [online] [Retrieved on May 1, 2011], Retrieved from the Internet: <URL:http://en.wikipedia.org/wiki/Predictive_Model_Markup_Language>, 7 pages.

Developer's Guide—Google Prediction, [online] [Retrieved on May 6, 2011], Retrieved from the Internet: ,URL: http:www.google.com/ .../developer-guide.htm>, 7 pages.

Makhtar, Mokhairi, et al., "Predictive Model Representation and Comparison: Towards Data and Predictive Models Governance", Computational Intelligence (UKCI), 2010 UK Workshop: Sep. 8-10, 2010; 6 pages.

Netuitive Announces Amazon EC2 Integration for Hybrid Cloud Performance Management [online] [retrieved on Apr. 26, 2011], Retrieved from the Internet: <URL: marketwire.com/.../Netuitive-Announc...>, 2 pages.

(56) References Cited

OTHER PUBLICATIONS

Google Apps Script Overview [online] [retrieved on May 6, 2011], Retrieved from the Internet: <URL: code.google.com/.../guide.html>, 4 pages.

"Google Prediction API (Labs)", Google.com, [Retrieved on May 4, 2011]. Retrieved from the Internet: <URL: http://code.google.com/apis/predict/>, 1 page.

Creative Commons Attribution-Share Alike 3.0 Unported, Cross-validation (statistics)., May 28, 2011, retrieved from: http://en.wikipedia.org/w/index.php?title=Cross-validation_(statistics)&oldid=431307466; pp. 1-5.

Creative Commons Attribution-Share Alike 3.0 Unported, Winnow (algorithm)., May 29, 2011, retrieved from http://en.wikipedia.org/w/index.php?title=Winnow_(algorithm)&oldid=431561845, 2 pages.

Bengio, Yoshua, Continuous Optimization of Hyper-Parameters, C.P. 6128, Succ. Centre-Ville, Montreal, Quebec, Canada, H3C 3J7, Sep. 29, 2000; Aug. 6, 2002, 7 pages.

Daelemans, Walter et al., Combined Optimization of Feature Selection and Algorithm Parameters in Machine Learning of Language, CNTS Language Technology Group, University of Antwerp, Universiteitsplein 1, B-2610 Antwerpen, Postdoctoral research of the Fund for Scientific Research, Flanders, Belgium, Nov. 24, 2003, 12 pages.

C.E. Rasmussen & C.K.I. Williams, Gaussian Processes for Machine Learning, Model Selection and Adaptation of Hyperparameters, Chapter 5, the MIT Press, 2006 Massachusetts Institute of Technology. [Retrieved from the Internet on Oct. 18, 2011]. Retrieved from the Internet: <URL: http://www.gaussianprocess.org/gpml/chapters/RW5.pdf, 24 pages.

R. Duin, "The Combining Classifer: to Train or Not to Train?", IEEE Pattern Recognition, 2002 Proceedings, 16 International Conference, pp. 765-770.

L. Denoyer et al., "Structured Multimedia Document Classification", ACM DocEng '03, Nov. 20-22, 2003, pp. 153-160.

J. Platt et a., "Large Margin DAGs for Multiclass Classification", in Advances in Neural Information Processing Systems, S.A. Solla et al., eds., MIT Press 2000, pp. 1-7.

Potrera, Cosmin Marian, et al.; DCFMS: "A chunk-based distributed file system for supporting multimedia communication", Computer Science and Information (FedCSIS), 2011 Federated Conference on Publication Year: 2011, pp. 737-741.

McDermott, et al.: "Generating models of mental retardation from data with machine learning"; Knowledge and Data Engineering Exchange Workshop, 1997. Proceedings Digital Object Identifier: 10,1109/KDEX.1997.629850 Publication Year: 1997, pp. 114-119.

English, et al.; "A grammatical approach to reducing the statistical sparsity of language models in natural domains", Acoustics, Speech, and Signal Processing, IEEE International Conference of ICASSO'86, vol. 11, Digital Object Identifier: 10.1109/CASSO.1986.1168955 Publication Year: 1986, pp. 1141-1144.

Altincay, et al.; Post-processing of Classifier Outputs in Multiple Classifier Systems:, 2002; Springer-Verlag Berlin Heidelberg; Lecture Notes in Computer Science, 2002, vol. 2364; pp. 159-168.

Altincay, et al.: "Why Does Output Normalization Create Problems in Multiple Classifier Systems?" 2002; IEEE; 16th International Conference on Pattern Recognition, Proceedings; vol. 2; pp. 775-778.

Stemmer, Georg et al.; "Comparison and Combination of Confidence Measures"; 2006; Springer-Vergal Berlin Heidelbreg; Lecture Notes in Computer Science 2006, vol. 2448; pp. 181-188.

Altincay, et al., "Undesirable Effects of Output Normalization in Multiple Classifier Systems", 2002; Elsevier Science B.V.; Pattern Recognition Letters 24 (2003); pp. 1163-1170.

Delany, et al., Generating Estimates of Classification Confidence for a Case-Based Spam Filter; 2005; Springer-Vergal Berlin Heidelberg; Lecture Notes in Computer Science, 2005, vol. 3620, pp. 177-190.

Dag Consistent Parallel Simpulation: A Predictable and Robust Conservative Algorithm, Wenton Cai et al.; Parallel and Distributed Simulation, 1997; Proceedings, 11th Workshop on Digital Object Identifier; 10.1109/PADS.1997.594604; pp. 178-181.

Stochastic Models for the Web Graph, Kumar, R. et al.; Foundations of Computer Science, 2000; Proceedings, 41st Annual Symposium on Digital Object Identifier; 11.1109/SFCS.2000.892065; pp. 57-65.

Explicit Modeling of Mode Transition Constraints for Model Predictive Control, Kobayashi, K. et al.; SICE Annual Conference, 2008 Digital Object Identifier: 10.1109/SICE.2008.4654911; pp. 1569-1574.

Research on Prediction Technique of Network Situation Awareness, Wang, et al.; Cybernetics and Intelligent Systems, 2008 IEEE Conference on Digital Object Identifier: 10.1109/ICCIS.2008.4670783; pp. 570-574.

T. Dietterich, Ensemble Methods in Machine Learning:, J. Kittler and F. Foli (Eds.), MCS 2000, pp. 1-15.

Predictive Dynamix Inc., Predictive Modeling Technology, Predictive Dynamix, Inc., 2003-2004, 5 pages.

Duin, P.W. Robert, et al., Experiments with Classifier Combining Rules, J. Kittler and F. Foli (Eds.): MCS 2000, LNCS 1857, pp. 16-29, 14 pages.

Barbieri, Maddalena Maria, et al., Optimal Predictive Model Selection, The Annals of Statistics, 2004, vol. 32, No. 3, 29 pages.

Yuan, Zheng et al., Combining Linear Progression Models: When and How? Dec. 2004, 27 pages.

Evaluating Predictive Models, 36-350, Data Mining, Principles of Data Mining, Chapter 7; Berk chapter 2, Oct. 26 and 28, 2001, 22 pages.

Weiss, Integrating Real-Time Predictive Analytics into SAP Applications [online], Dec. 30, 2009 [retrieved on Sep. 29, 2011], Retrieved from the Internet: ,URL:http://www.sdn.sap.com/irj/scn/go/portal/prtroot/docs/library/uuid/a07faefd-61d7-2c10-bba6-89ac5ffc302c?QuickLink=index&overridelayout=true>, 1 page.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, the free encyclopedia, [online] [retrieved on Sep. 8, 2011]. Retrieved from the Internet: http://en.wikipedia.org/wiki/Active learning (machine learning), 3 pages.

* cited by examiner

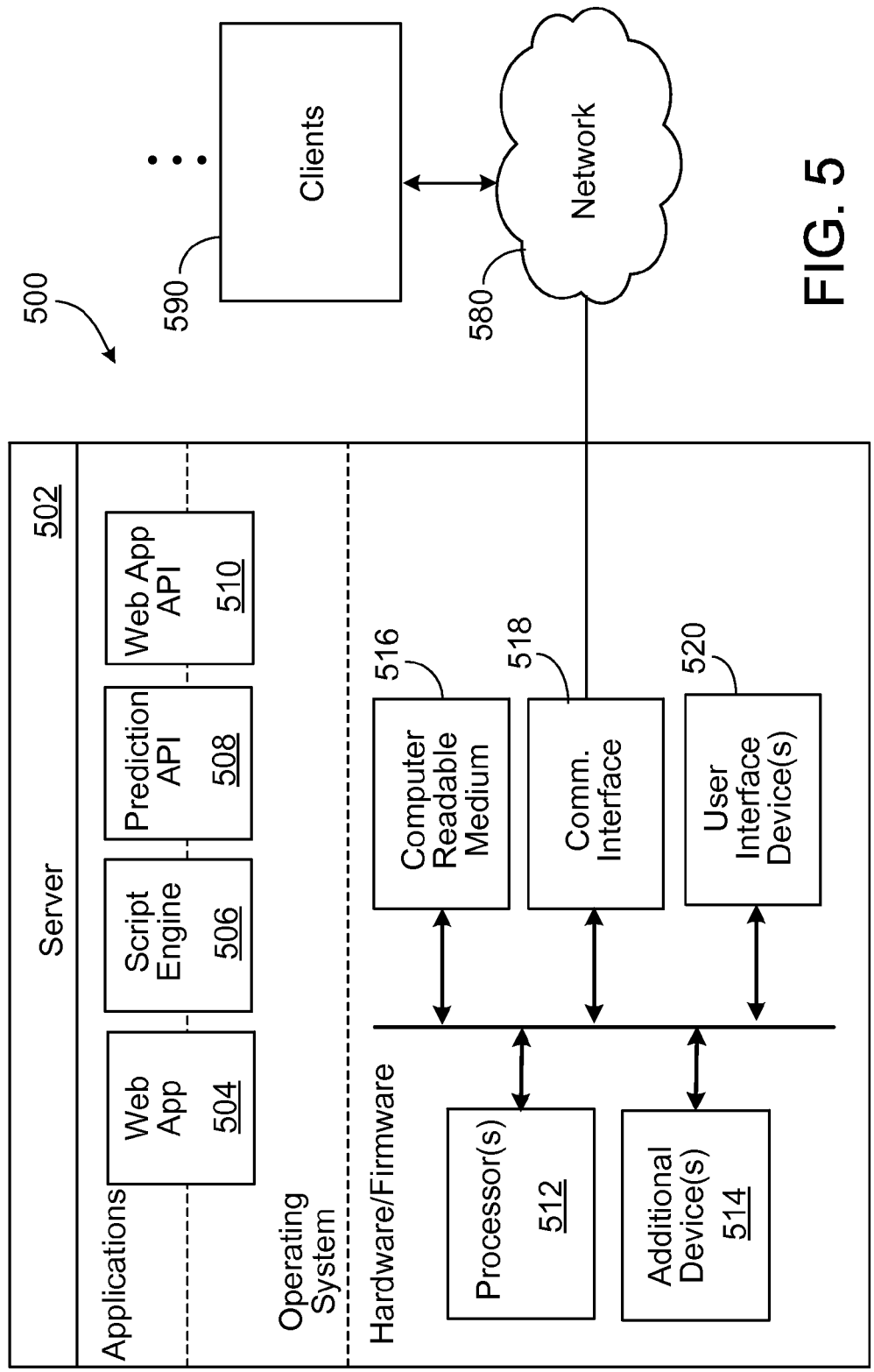

PREDICTIVE MODEL APPLICATION PROGRAMMING INTERFACE

CROSS-REFERENCE TO RELATED APPLICATIONS

This application is a continuation of, and claims priority under 35 U.S.C. §120 to, U.S. patent application Ser. No. 13/250,394, filed on Sep. 30, 2011, which is incorporated here by reference in its entirety. This application claims the benefit under 35 U.S.C. §119(e) of the filing date of U.S. Patent Application No. 61/483,573, filed on May 6, 2011, which is incorporated here by reference in its entirety.

BACKGROUND

This specification relates to integration of predictive models and application software.

Predictive modeling generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Examples of predictive models include Naive Bayes classifiers, k-nearest neighbor classifiers, support vector machines, and logistic regression techniques, for example. Typically, a predictive model is trained with training data that includes input data and output data that mirror the form of input data that will be entered into the predictive model and the desired predictive output, respectively. The amount of training data that may be required to train a predictive model can be large, e.g., in the order of gigabytes or terabytes. The number of different types of predictive models available is extensive, and different models behave differently depending on the type of input data. Additionally, a particular type of predictive model can be made to behave differently, for example, by adjusting the hyper-parameters or via feature induction or selection.

SUMMARY

In various implementations, a prediction model application programming language interface (API) accessible through an application scripting language allows users to programmatically train and/or use predictive models within software applications such as, for instance, spreadsheets, calendars, electronic mail (e-mail), and word processors. For example, a script executed by an e-mail application can invoke a predictive model to predict whether an incoming e-mail message is SPAM. As a further example, a script executed by a spreadsheet can provide the value of a spreadsheet cell as input to a predictive model and then present the output of the predictive model in another spreadsheet cell.

In general, one innovative aspect of the subject matter described in this specification can be embodied in methods that include the actions of presenting a graphical user interface of a web application on a client device, wherein the graphical user interface presents multiple cells in a matrix of cells, wherein each cell of the multiple cells is an interactive element, executing a first script found in a first cell of the multiple cells, the first script invoking (i) a first model of a plurality of predictive models using data of a first plurality of the cells to train the first model and (ii) a second model of the plurality of predictive models using the data of the first plurality of the cells to train the second model, and executing a second script found in a second cell of the multiple cells, the second script invoking (i) the trained first model with data from a second plurality of cells as input and using output from the trained first model to determine a value of a third cell in the matrix of cells, and (ii) the trained second model with data from the second plurality of cells as input and using output from the trained second model to determine a value of a fourth cell in the matrix of cells.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination.

The output from the trained first model is a prediction by the trained first model that is based on the data from the second plurality of cells. The output from the trained second model is a prediction by the trained second model that is based on the data from the second plurality of cells. The method further includes executing the first script in response to an explicit user invocation. The method further includes executing the second script in response to detection of web application activity. The first script further invokes (i) the first model using data from one or more web application files to train the first model and (ii) the second model using the data from one or more web application files to train the second model. A portion of the execution of the first script and the second script occurs at a same time. The method further includes receiving the first script, the second script, or both from the client device. The method further includes executing the first script, the second script, or both on the client device.

Particular embodiments of the subject matter described in this specification can be implemented so as to realize one or more of the following advantages. Predictive models can be trained and queried from within web applications through the execution of web application scripts. Model training data can be culled from web application data files. Model predictions can be utilized within web applications and stored in web application data files. Scripts can be executed in parallel along with web applications and other computer programs. Interactive data fields in the graphical user interfaces of web applications can be used as the source of training data or prediction queries, and can also be used to hold or process the output of model predictions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a schematic diagram of an example server.

Like reference numbers and designations in the various drawings indicate like elements.

DETAILED DESCRIPTION

Figure 1:
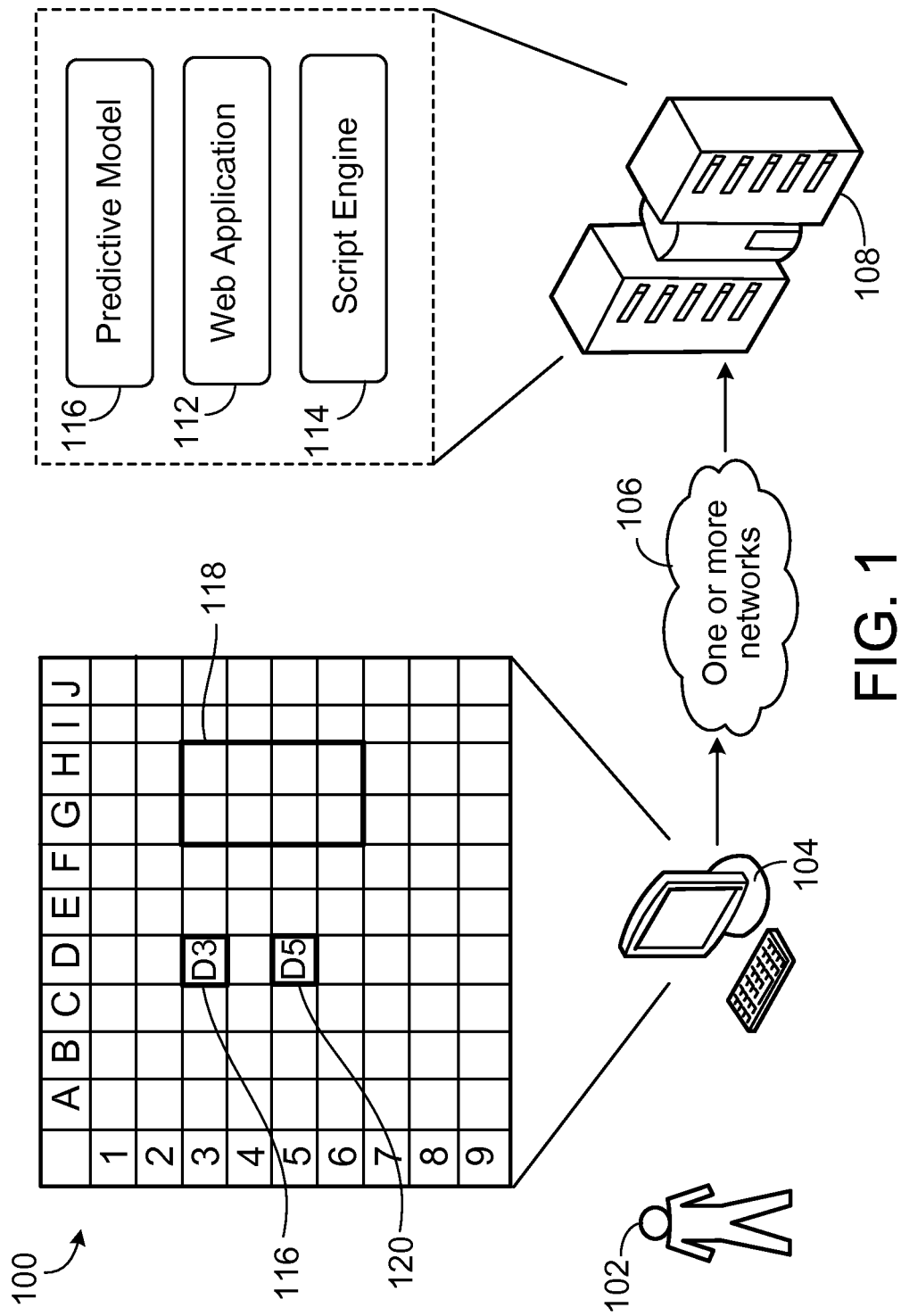
FIG. 1 illustrates use of the prediction API in conjunction with an example spreadsheet web application.

A web application is software that executes on one or more server computing devices (or "servers") and that is accessed over a network such as the Internet by users through web browsers or other software that runs on client computing devices (or "clients"). User data files that are created, accessed, or modified by web applications are stored in repositories that are accessible to the servers. Web applications can provide a graphical user interface (GUI) to client devices by sending the client devices Hypertext Markup Language (HTML) documents or other information that can be used to render the GUIs. A scripting language allows users to control some or all aspects of web applications that recognize scripts written in the scripting language. The scripting language is a computer programming language. A script is a set of instructions that are written in the scripting language. In some implementations, the scripting language is JAVASCRIPT. Other scripting languages are possible including functional and procedural programming languages. A script can be executed entirely on a client, entirely on a server, or on both the client and the server. In some implementations scripts are executed on one or more servers. Script execution can be initiated through explicit user invocation (e.g., selecting an interactive button in a GUI) or through web application activity (e.g., a spreadsheet web application that recalculates the value of a spreadsheet cell invokes a script that is referenced in a formula for the cell.)

In some implementations, the scripting language or a software library accessible from the scripting language provides a set of programmatic objects whose methods can be invoked in scripts to access functionality of web applications such as spreadsheets, word processors, email, financial tools, calendars, and maps, for example. (Alternatively, the functionality can be accessed through function or procedure calls rather than through method invocations.) By way of illustration, an object that represents a spreadsheet web application can have methods for reading, writing and creating spreadsheet data files, performing calculations on information in spreadsheet cells, and manipulating the spreadsheet GUI such as, for instance, by opening dialog boxes. Likewise, an object that represents an email web application can have methods for retrieving new email messages, sending email messages, moving email messages to data files and directories, and so on. In addition to accessing web application functionality in scripts, a prediction API is provided to allow scripts to programmatically train and/or use predictive models (or "models"). The prediction API allows users to upload training data from web application data files (or from other sources of data) and use the uploaded data to train a model. A model that has been trained using uploaded data, or a previously trained model, can be invoked by scripts to obtain predictions for queries. In various implementations, a prediction is either a numeric value or a categorization of a query.

FIG. 1 illustrates use of the prediction API in conjunction with an example spreadsheet web application. A computer spreadsheet is an automated accounting worksheet. The spreadsheet web application 112 software executes on one or more servers in a data warehouse 108 that houses hundreds or thousands of servers. The web application 112 provides an interactive GUI 100 through a computer network 106 such as the Internet to software (e.g., a web browser) executing on a client computing device 104. The GUI 100 is displayed for a user 102 and allows the user 102 to interact with the web application 112.

The GUI 100 presents multiple cells (e.g., cells 116 and 120) in a two-dimensional matrix consisting of rows and columns. A cell is an interactive field that can accept user input such as a formula and present an output value such as alphanumeric text or a numeric value, for example. A formula defines how the content of a cell is calculated (e.g., from the contents of one or more cells in the matrix or other information). As mentioned above, a formula can invoke a script which can, in turn, invoke functionality of the prediction API to train a predictive model from data in cells or calculate the value of cells using predictions from a model. (The prediction API is described further below.)

For example, the cells in range 118 can be submitted as training data to train a model using the prediction API in a script. In various implementations, a model is either categorical (if its predictions are categories) or regression (if its predictions are numeric). Training data comprises examples that each comprise one or more data values plus an answer (a category or a value) for that example. By way of illustration, the training data in TABLE 1 consists of examples that are email message subject lines and a category that indicates whether each example represents SPAM or not.

TABLE 1

| EMAIL SUBJECT LINE | ANSWER |
|---|---|
| "You have won $$$" | "spam" |
| "Lose weight fast!" | "spam" |
| "Lowest interest rates ever!" | "spam" |
| "How are you?" | "not spam" |
| "Trip to New York" | "not spam" |

After a model has been trained against training data, queries can be submitted to the model. In some implementations, queries are similar in form to training examples: that is, a query has the same data values but does not include the answer. The trained model uses patterns that it learned from the training data to either find the closest category for the submitted query (if it is a categorical model) or estimate a value for the query (if it is a regression model), and returns the category or value.

Scripts are executed by a script engine 114. The script engine 114 is invoked by the web application 112 (or other application) when a script needs to be processed, such as in the example of a spreadsheet when the spreadsheet requires the script to be executed in order to determine the value of a spreadsheet cell. The script engine 114 is a computer program that interprets or executes scripts. In some implementations, the script engine 114 is a JAVASCRIPT interpreter. The script engine 114 can translate or compile scripts to an intermediate language or to a machine language before executing them. Other types of script engines are possible. Scripts that utilize functionality of the prediction API can communicate with one or more models 110 in order to train the models and/or invoke the models to make predictions.

By way of further illustration, cell 116 in the spreadsheet GUI 100 can have a formula which invokes the following script:
1. var ss=SpreadsheetApp.getActiveSpreadsheet( );
2. var sheet=ss.getActiveSheet( );
3. var myValue=sheet.getRange("D3").getValue( );
4. var result=predict ("Mike's Model", myValue);
5. sheet.getRange("D5").setValue(result);

The first line of the above script (written in JAVASCRIPT) creates an object "ss" that represents the active spreadsheet in a web application (i.e., the spreadsheet that currently has input focus). The second line of the script obtains a sheet object "sheet" that represents the active sheet within the active spreadsheet. Scripts reference interactive fields of graphical user interfaces by reading or writing values of the fields. The third line obtains the value (e.g., text or a number) of the D3 cell 116 from the active sheet and places it in variable "myValue". Next, in the fourth line of the script, the value of cell D3 is sent as a query to a model referred to as "Mike's Model"). A script references a model by providing an input parameter to a prediction API function that identifies the model or a location of training data for the model. The prediction of the model is placed in the "result" variable which then provides the value of spreadsheet cell D5 120 in the fifth line of the script.

TABLE 2 below shows an example set of prediction API functions. The prediction API functionality can be exposed in scripts as methods, functions, procedure calls, or macros.

determine that an email message is not spam and use another model to determine the sentiment of the email message.

Figure 2:
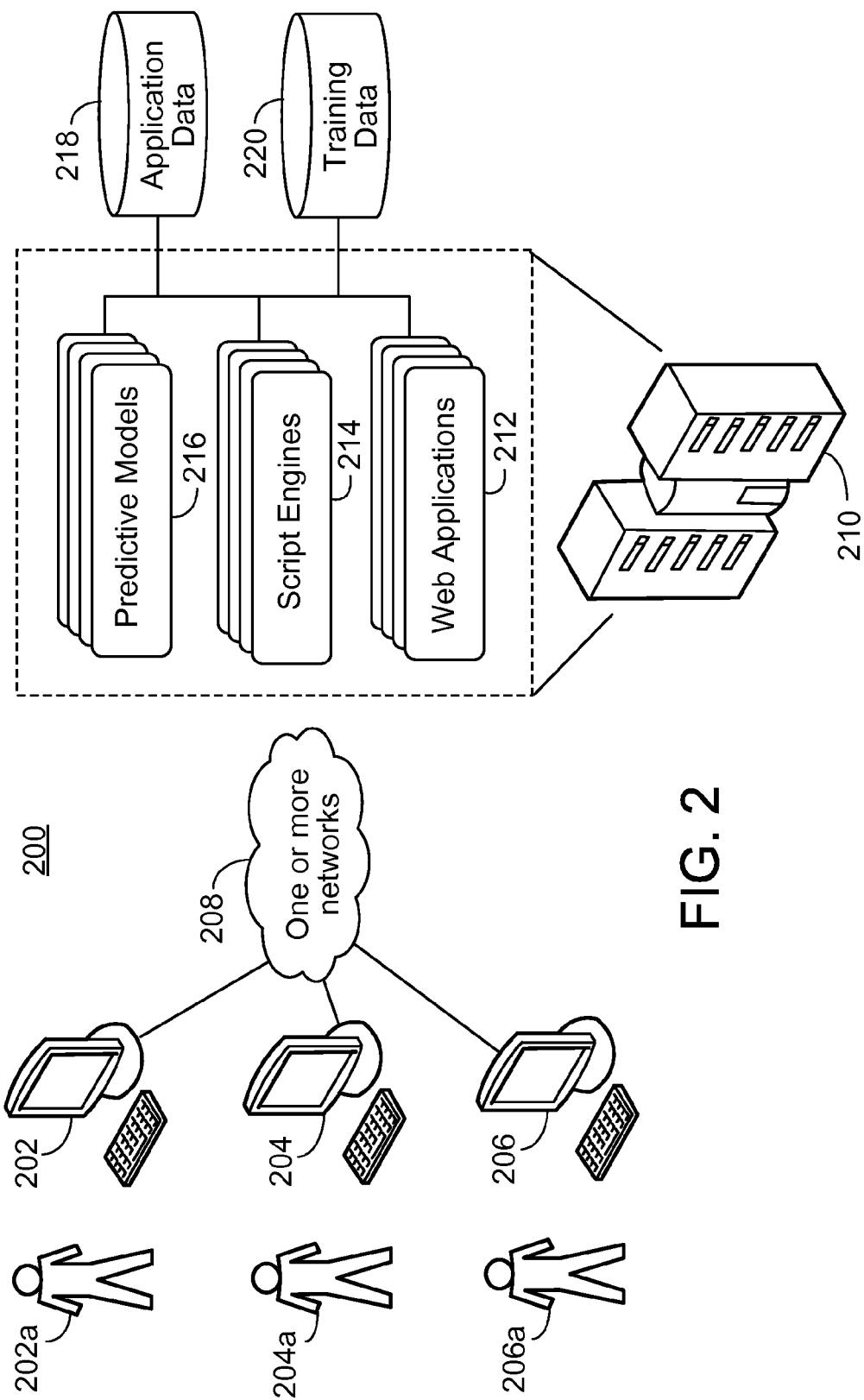
FIG. 2 illustrates an example predictive modeling system.

FIG. 2 illustrates an example predictive modeling system 200. The system includes one or more clients (clients 202, 204 and 206) that can communicate through one or more networks 208 with a collection of remote servers, such as servers deployed in a data center 210 or in different geographic locations. The servers execute computer programs that implement web applications 212, script engines 214, and predictive models 216. Web applications 212 invoke script engines 214 at various times to execute scripts. Script engines 214 allow scripts to utilize predictive models 216 for training and prediction.

A given server comprises one or more data processing apparatus. The servers can communicate with each other and with storage systems (e.g., application data storage system 218 and training data storage system 220) at various times using one or more computer networks or other communication means. For example, the servers in the data center 210 can be coupled to an intranet. A computer program can

TABLE 2

| PREDICTION API FUNCTION | DESCRIPTION |
|---|---|
| Invoke training | This function initiates training of a model by sending a request to a model training system (or other system). Input parameters of the function are identification of the model to train and the storage location of the training data. In some implementations, the identification of the model and the storage location of the training data are one in the same. In this case, only one input parameter needs to be provided to the function. The storage location can be a file directory path or other resource locator. In some implementations, the invoke training function is asynchronous which allows the script engine to continue execution of a script without waiting for the model training to complete. |
| Check training status | This function initiates a request to a model training system (or other system) to determine if model training has completed. Input parameters of the function are identification of the model to train and the storage location of the model's training data. In some implementations, the identification of the model and the storage location of the training data are one in the same. In this case, only one input parameter needs to be provided to the function.<br>In some implementations, an additional input parameter of the function is the model type: classification or regression. If the model type is classification, a classification accuracy (e.g., a number between 0.0 and 1.0, where 1.0 is 100% accurate) can be specified as an additional input parameter for the function. The classification accuracy is an estimate, based on the amount and quality of the training data, of the estimated prediction accuracy. This can be used to decide whether the results are accurate enough to use the model for predictions.<br>If the model type is regression, a mean squared error which is 0.0 or greater can be specified as an additional input parameter for the function. The mean squared error is the average of the square of the difference between the predicted and actual values. This is an estimate, based on the amount and quality of the training data, of the estimated prediction accuracy. This can be used to decide whether the results are accurate enough to use the model for predictions. |
| Predict | This function requests a prediction from a model. Input parameters to the function are a query and identification of a model that will perform the prediction. For example, the query specifies the same data as a training example without the answer. In some implementations, the identification of the model is the storage location of the training data that was used to train the model.<br>For a categorical model, the function returns one or more categories ("labels") and corresponding scores for the query. In some implementations, the label having the largest, most positive score is the most likely match. Alternatively, the function can return a single category that best fits the query. For a regression model, a predicted value for the query, calculated based on given values in the training data, is returned by the function. |
| Delete | This function deletes a model specified in the request. |

A single script can invoke the prediction API functions for multiple models. For example, a script can use one model to execute on a single server or, alternatively, the program can be organized into components that execute on multiple servers.

There can be more than one instance or copy of a given computer program executing on the collection of servers at any given time. Multiple copies of a computer program that implements the script engine, for instance, can be executing at the same time on one or more servers providing script execution for different web applications 212. Scripts can be executed in parallel by the script engines 214. Two scripts are executed in parallel if they are executed on different servers and if at least a portion of their execution occurs at the same time. For example, assume that script A is executed by a script engine executing on server S1 and script B is executed by a script engine executing on server S2. If some period of time exists where script A and B are both being executed, then the scripts are executed in parallel.

Figure 3:
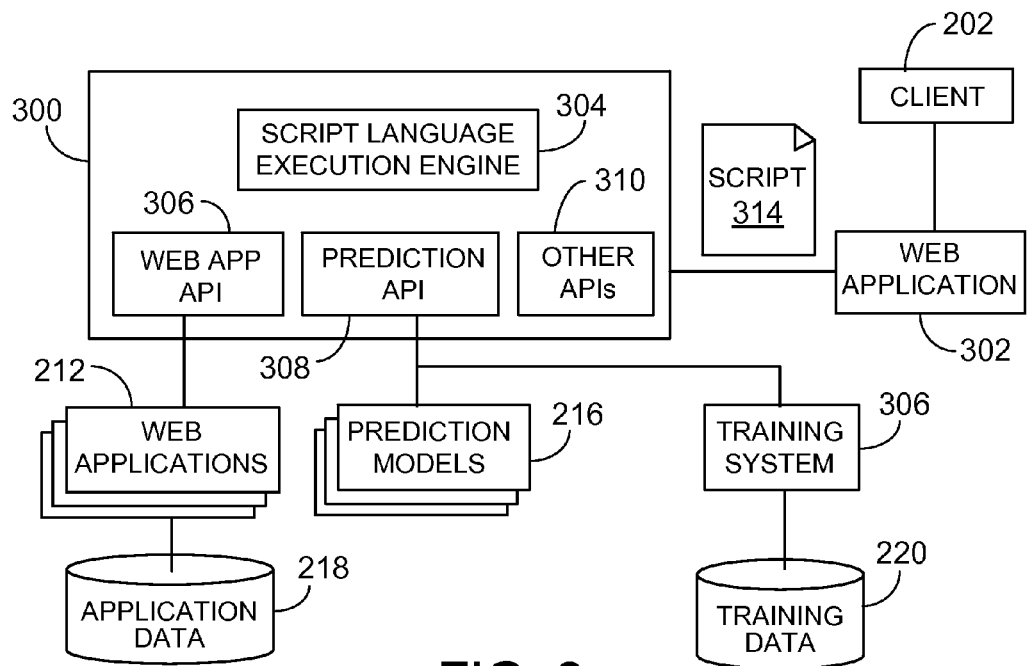
FIG. 3 illustrates an example script engine.

As an illustration, and with reference to FIG. 3, client 202 can interact with web application 302. In order to execute a script 314 the web application 302 invokes a script engine 300. The script engine 300 is a separate computer program or, in some implementations, is part of the computer program that makes up the web application 302. In either case, the script engine 300 is provided with the script (or a memory location of the script). The web application 302 and the script engine 300 can communicate through method invocation, shared memory, network communication, or other means of inter or intra-process communication. The script engine 300 includes a script language execution engine 304, a web application API 306, a prediction API 308 and, optionally, other APIs (310). Scripts can contain references to interactive fields of web applications 212 as input parameters to the web application API 306 methods. Scripts can also contain references to predictive models 216 as input parameters to the prediction API 308 functions. The script language execution engine 304 interprets or executes the script 314. In some implementations, the execution engine 304 is a JAVASCRIPT interpreter. The web application API 306 exposes functionality through objects, methods, or functions that allow scripts to utilize functionality of web applications 212 and access application data 218 such as user data files.

The prediction API 308 exposes functionality through objects, methods or functions that allow scripts to query models and train models 216 using training data obtained from application data 218. In some implementations, models are trained by a training system 316 which receives requests from the prediction API 308 to initiate training and check the status of training. The prediction API 308 provides the training system 316 with the location of training data 220 to be used in training a particular model. For example, the training data, such as a range of cells in a spreadsheet, can be obtained from the application data 218 through use of the web application API 306 and then provided to the training system 316 through use of the prediction API 308.

Other APIs 310 can include, for instance, an API that allows scripts to communicate over computer networks using Transmission Control Protocol/Internet Protocol (TCP/IP) and an authentication API which provides a mechanism for authorizing a script's request to access a user's application data 218, models 216, and training data 220 through the web application API 306 and the prediction API 308. In some implementations, the web application 302 or the script engine 300 requests access permission from an authorization server. The authorization server is responsible for prompting the user (e.g., user 202a) for permission to grant access to the required data, if necessary. If permission is granted, the authorization server returns a token that can be shared with the web application 302, the web application API 306, and the prediction API 308 in order to access the required data. Other authorization mechanisms are possible.

Figure 4:
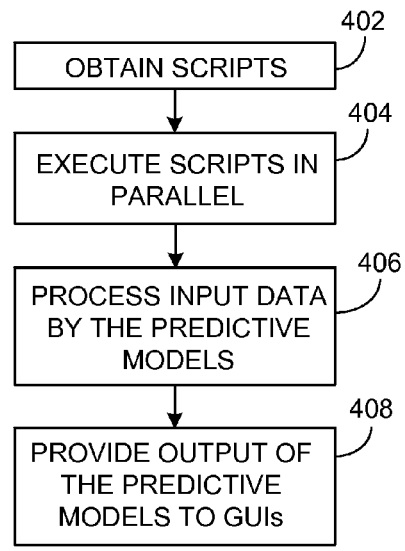
FIG. 4 is a flowchart of an example process for using predictive models.

FIG. 4 is a flow chart of an example process for using predictive models as can be implemented in one or more computer programs executing on one or more data processing apparatus. Scripts are obtained from different clients (e.g., clients 202, 204 and 206; 402). Each of the scripts contains at least one reference to an interactive field (e.g., cell 116) of a web application GUI (e.g., GUI 100) and at least one reference to a predictive model. Each script is executed in parallel by script engines (e.g., script engine 300) that execute on different data processing apparatus (404). Script execution causes data of the interactive fields referenced by the script to be provided as input to the respective predictive model referenced by the script. Each input is processed by a respective predictive model that executes on a different data processing apparatus (406). The outputs of the predictive models are provided to the respective script engines. Executing each script includes providing the output of each respective predictive model to the respective client for presenting in the graphical user interface of the respective client (408).

FIG. 5 is a schematic diagram of an example server. The server 502 is optionally connected to one or more user or client computers 590 through a network 580. The server 502 consists of one or more data processing apparatuses. While only one data processing apparatus is shown in FIG. 5, multiple data processing apparatus can be used. The server 502 includes various software modules, e.g. executable software programs or libraries, including an web application 504, script engine 506, prediction API 508, and web application API 510. Although several software modules are illustrated, there may be fewer or more software modules. Moreover, the software modules can be distributed on one or more data processing apparatus connected by one or more networks or other suitable communication mediums.

The server 502 also includes hardware or firmware devices including one or more processors 512, one or more additional devices 514, a computer readable medium 516, a communication interface 518, and one or more user interface devices 520. Each processor 512 is capable of processing instructions for execution within the server 502. In some implementations, the processor 512 is a single or multi-threaded processor. Each processor 512 is capable of processing instructions stored on the computer readable medium 516 or on a storage device such as one of the additional devices 514. The server 502 uses its communication interface 518 to communicate with one or more computers 590, for example, over a network 580. Examples of user interface devices 520 include a display, a camera, a speaker, a microphone, a tactile feedback device, a keyboard, and a mouse. The server 502 can store instructions that implement operations associated with the modules described above, for example, on the computer readable medium 516 or one or more additional devices 514, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
   presenting a graphical user interface of a web application on a client device, wherein the graphical user interface presents multiple cells in a matrix of cells, wherein each cell of the multiple cells is an interactive element;
   executing a first script found in a first cell of the multiple cells, the first script invoking (i) a first model of a plurality of predictive models using data of a first plurality of the cells to train the first model and (ii) a second model of the plurality of predictive models using the data of the first plurality of the cells to train the second model; and
   executing a second script found in a second cell of the multiple cells, the second script invoking (i) the trained first model with data from a second plurality of cells as input and using output from the trained first model to determine a value of a third cell in the matrix of cells, and (ii) the trained second model with data from the second plurality of cells as input and using output from the trained second model to determine a value of a fourth cell in the matrix of cells.

2. The method of claim 1, wherein the output from the trained first model is a prediction by the trained first model that is based on the data from the second plurality of cells and the output from the trained second model is a prediction by the trained second model that is based on the data from the second plurality of cells.

3. The method of claim 1, further comprising:
   executing the first script in response to an explicit user invocation.

4. The method of claim 1, further comprising:
   executing the second script in response to detection of web application activity.

5. The method of claim 1, wherein the first script further invokes (i) the first model using data from one or more web application files to train the first model and (ii) the second model using the data from one or more web application files to train the second model.

6. The method of claim 1, wherein a portion of the execution of the first script and the second script occurs at a same time.

7. A storage medium having instructions thereon that, when executed by one or more computers, cause the one or more computers to perform a method comprising:
   presenting a graphical user interface of a web application on a client device, wherein the graphical user interface presents multiple cells in a matrix of cells, wherein each cell of the multiple cells is an interactive element;
   executing a first script found in a first cell of the multiple cells, the first script invoking (i) a first model of a plurality of predictive models using data of a first plurality of the cells to train the first model and (ii) a second model of the plurality of predictive models using the data of the first plurality of the cells to train the second model; and
   executing a second script found in a second cell of the multiple cells, the second script invoking (i) the trained first model with data from a second plurality of cells as input and using output from the trained first model to determine a value of a third cell in the matrix of cells, and (ii) the trained second model with data from the second plurality of cells as input and using output from the trained second model to determine a value of a fourth cell in the matrix of cells.

8. The storage medium of claim 7, wherein the output from the trained first model is a prediction by the trained first model that is based on the data from the second plurality of cells and the output from the trained second model is a prediction by the trained second model that is based on the data from the second plurality of cells.

9. The storage medium of claim 7, wherein the method further comprises:
   executing the first script in response to an explicit user invocation.

10. The storage medium of claim 7, wherein the method further comprises:
    executing the second script in response to detection of web application activity.

11. The storage medium of claim 7, wherein the first script further invokes (i) the first model using data from one or more web application files to train the first model and (ii) the second model using the data from one or more web application files to train the second model.

12. The storage medium of claim 7, wherein a portion of the execution of the first script and the second script occurs at a same time.

13. A system comprising:
    one or more computers configured to perform a method comprising:
       presenting a graphical user interface of a web application on a client device, wherein the graphical user interface presents multiple cells in a matrix of cells, wherein each cell is an interactive element;

executing a first script found in a first cell of the multiple cells, the first script invoking (i) a first model of a plurality of predictive models using data of a first plurality of the cells to train the first model and (ii) a second model of the plurality of predictive models using the data of the first plurality of the cells to train the second model; and executing a second script found in a second cell of the multiple cells, the second script invoking (i) the trained first model with data from a second plurality of cells as input and using output from the trained first model to determine a value of a third cell in the matrix of cells, and (ii) the trained second model with data from the second plurality of cells as input and using output from the trained second model to determine a value of a fourth cell in the matrix of cells.

14. The system of claim 13, wherein the method further comprises:
receiving the first script, the second script, or both from the client device.

15. The system of claim 13, wherein the method further comprises:
executing the first script, the second script, or both on the client device.

16. The system of claim 13, wherein the method further comprises:
executing the first script in response to an explicit user invocation.

17. The system of claim 13, wherein the method further comprises:
executing the second script in response to detection of web application activity.

18. The system of claim 13, wherein the output from the trained first model is a prediction by the trained first model that is based on the data from the second plurality of cells and the output from the trained second model is a prediction by the trained second model that is based on the data from the second plurality of cells.

19. The system of claim 13, wherein the first script further invokes (i) the first model using data from one or more web application files to train the first model and (ii) the second model using the data from one or more web application files to train the second model.

20. The system of claim 13, wherein a portion of the execution of the first script and the second script occurs at a same time.

* * * * *